United States Patent
Shively et al.

(12) 
(10) Patent No.: US 6,423,222 B1
(45) Date of Patent: Jul. 23, 2002

(54) ERGONOMICALLY CONFIGURED CAN FOR FILTER CARTRIDGES AND WRENCH FOR USE THEREWITH

(75) Inventors: Terrance Allen Shively, Salene, MI (US); Willie Luther Stamey, Jr., Gaston; Gregory Keith Rhyne, Denver, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/745,437

(22) Filed: Dec. 26, 2000

(51) Int. Cl.[7] .......................... B01D 27/08; B25B 13/04; B25B 13/06; B25B 13/48
(52) U.S. Cl. ...................... 210/232; 210/238; 210/440; 210/DIG. 17; 81/121.1; 81/176.2
(58) Field of Search ................................. 210/232, 440, 210/DIG. 17, 238; 81/176.2, 121.1

(56) References Cited

U.S. PATENT DOCUMENTS

| | | | |
|---|---|---|---|
| 3,224,585 A | * 12/1965 | Scavuzzo et al. |
| 3,240,086 A | * 3/1966 | Way |
| 3,912,633 A | 10/1975 | Delaney |
| 4,169,058 A | * 9/1979 | Pickett et al. |
| 4,266,452 A | 5/1981 | Crist |
| 4,337,678 A | 7/1982 | Mumford |
| 4,364,829 A | 12/1982 | Atkins et al. |
| 4,865,727 A | 9/1989 | Krauss |
| 4,867,017 A | * 9/1989 | Holman |
| 4,964,330 A | 10/1990 | Swinney et al. |
| 5,271,299 A | * 12/1993 | Wadsworth |
| 5,284,579 A | 2/1994 | Covington |
| 5,366,084 A | * 11/1994 | Post |
| 5,440,957 A | * 8/1995 | Rogers |
| 5,587,066 A | 12/1996 | Covington |
| 5,606,897 A | 3/1997 | Quinn |
| 5,744,032 A | 4/1998 | Kemper |
| 5,924,342 A | * 7/1999 | Chou |

FOREIGN PATENT DOCUMENTS

| | | | |
|---|---|---|---|
| EP | 343039 | * | 7/1992 |
| FR | 1532437 | * | 5/1967 |

* cited by examiner

*Primary Examiner*—Thomas M. Lithgow
(74) *Attorney, Agent, or Firm*—Millen, White, Zelano & Branigan, P.C.

(57) ABSTRACT

A spin-on oil filter cartridge has a can with a gripping portion at the free end comprising seven concave, arcuate flutes which are spaced from one another. The seven arcuate flutes provide an ergonomically configuration which facilitates removal of the filter cartridge by hand. If the filter cartridge is too tightly engaged to be removed for replacement purposes, a tool in the form of a socket wrench is provided wherein the tool includes a socket portion which compliments the gripping portion of the filter cartridge. The tool further includes a knob fixed thereto which provides increased hand purchase which facilitates rotation of the spin-on oil filter cartridge.

20 Claims, 4 Drawing Sheets

ERGONOMICALLY CONFIGURED CAN FOR FILTER CARTRIDGES AND WRENCH FOR USE THEREWITH

FIELD OF THE INVENTION

The present invention is directed to an ergonomically configured can for a spin-on filter cartridge and a wrench for use therewith. More particularly, the present invention is directed to such a can and wrench which facilitate removing spin-on oil filters by providing a structure which provides a good manual grip as well as a convenient surface for attaching a wrench.

BACKGROUND OF THE INVENTION

Almost all lubrication oil filters for light vehicles such as passenger cars and light trucks utilize spin-on filter cartridges in which oil filters have a base plate with a threaded bore therethrough and, the base plate having an annular gasket which fits is around the threaded bore adjacent the periphery of the base plate. While spin-on lubrication cartridges are relatively easy to mount by simply spinning or turning the cartridge by hand, they can be very difficult to remove by hand when it is time for replacement because the gasket can exert a substantial axial force and because the threads tend to bind. Accordingly, it is frequently necessary to use a band type wrench which fits around the cartridge in order to apply sufficient torque to the cartridge to break the bond which is formed between the cartridge and the engine.

Applying the wrench is at least slightly frustrating and consumes time. Accordingly, there is a need for a spin-on canister which can be both mounted and removed by hand without the use of a wrench. Since spin-on canisters may from time to time become stuck so that they are still difficult to remove by hand, there is also a need for a more conveniently useable tool or wrench which enables a mechanic to conveniently assert additional force in case gripping the canister by hand does not work to remove the canister.

SUMMARY OF THE INVENTION

In view of the aforementioned considerations, the present invention is directed to a can for containing a filter element of a spin-on filter cartridge, wherein the spin-on filter cartridge has a base plate with a threaded port therethrough and an annular gasket thereon, the threaded port and annular gasket tightly coupling the cartridge to an engine. The can has a first end and a second end wherein the first end includes a base plate for coupling the cartridge to the engine with at least a selected level of torque. The second end of the can has a gripping portion wherein the gripping portion includes seven flutes with each flute having an axially extending, concave wall which opens axially through the second end of the can to facilitate gripping of the can.

In a more specific aspect, the flutes terminate in bottom shelves which extend radially inward from a cylindrical outer wall surface of the can.

In still a more specific aspect of the invention, the flutes are spaced from one another by arcuate segments in the outer cylindrical wall surface of the can.

In still another aspect of the invention a wrench is provided for rotating spin-on cartridges about their axes wherein the wrench has a socket having a shape, complimenting the shape of the gripping portion of the can, whereby when the gripping portion of the can is received within the socket of the wrench the wrench can be used to rotate the spin-on filter cartridge.

In still a further aspect of the invention. the wrench includes a handle extending therefrom. Preferably the handle comprised of a stem fixed to the end of the socket with a knob fixed to the end of the stem.

BRIEF DESCRIPTION OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
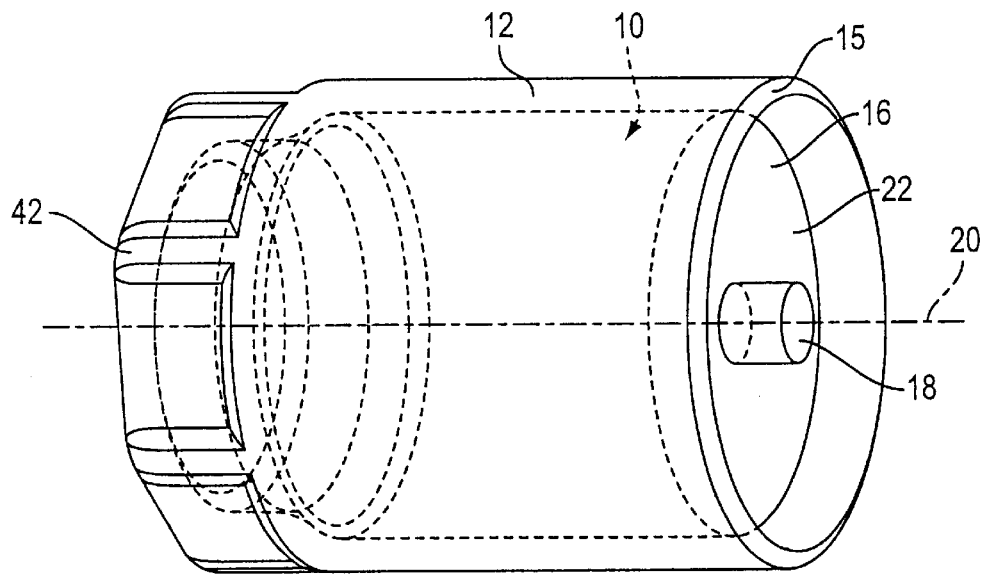
FIG. 1 is a side perspective view of a filter cartridge with portions in lines, the filter cartridge having a can configured in accordance with the principles of the present invention.
Figure 2:
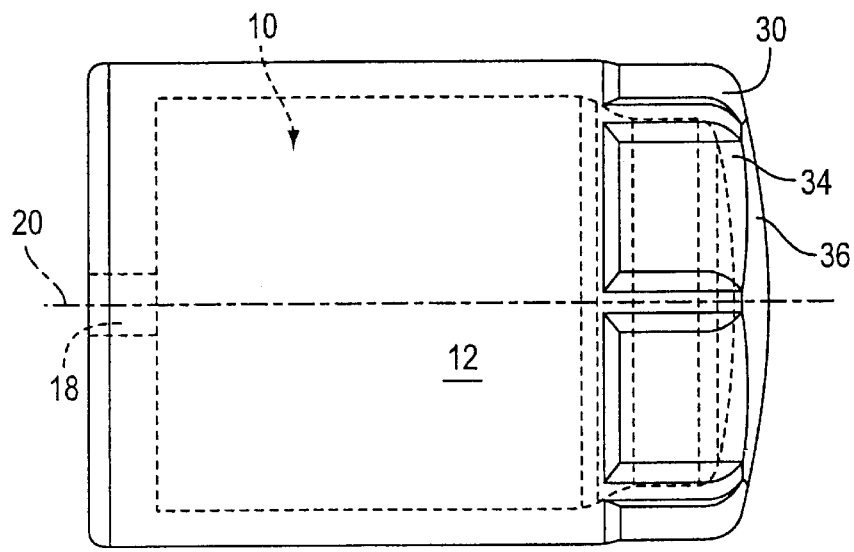
FIG. 2 is a side view of the filter cartridge of FIG. 1 with portions in dotted lines.
Figure 3:
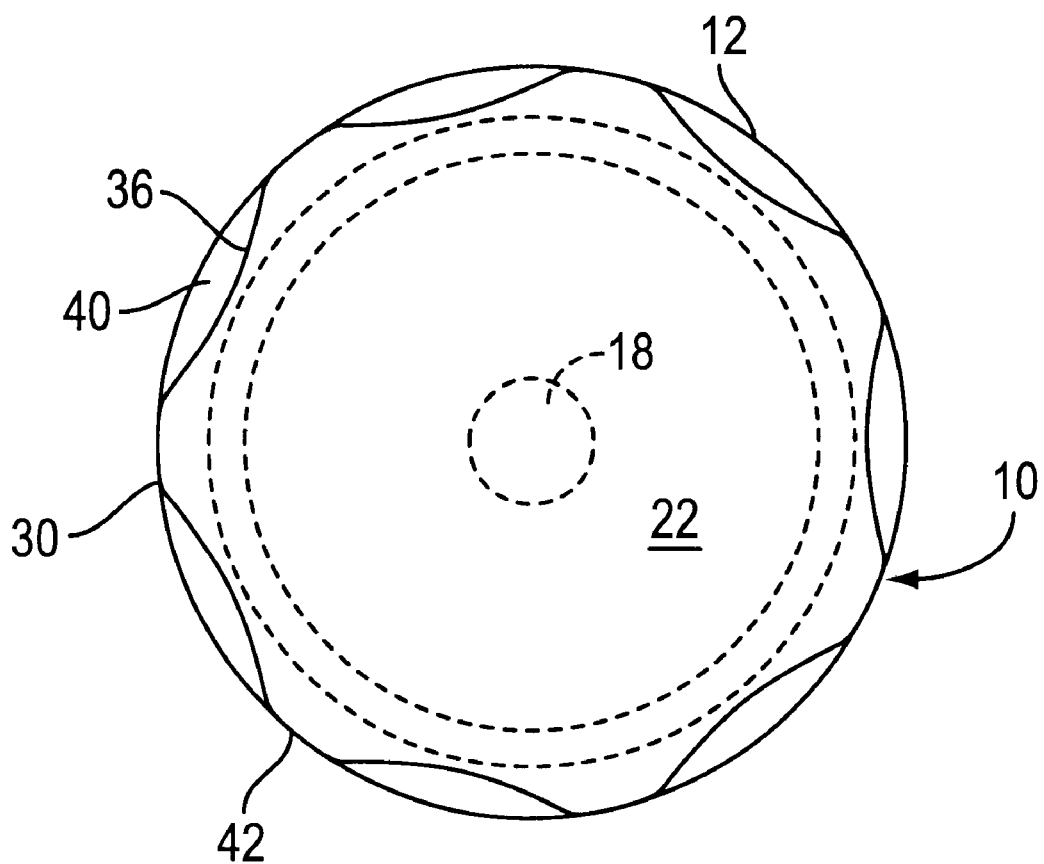
FIG. 3 is an end view of the filter cartridge of FIGS. 1–2.

Referring now to FIGS. 1–3 there is shown a spin-on filter cartridge 10 having a can 12 for providing a better housing configured in accordance with the principles of the present invention. The spin-on filter cartridge 10 has a base plate 14 which closes the open end of the can 12 and includes a threaded bore 16 which is coaxial with the axis 18 of the spin-on cartridge. The threaded port 18 receives a threaded stud (not shown) projecting from an internal combustion engine (not shown) and retains the filter cartridge 10 in sealing relationship with the internal combustion engine by movement in the axial direction to compress an annular gasket 22 against the engine. Normally, the filter cartridge 10 is mounted on the engine by rotating it about the axis 20 by hand and then hand tightening cartridge 10 in order to compress a seal 22 sufficiently to prevent leakage of oil and to firmly seat the filter cartridge 10 against the engine.

After being hand tightened, the filter cartridge 10 can become seated with enough sufficient force to make it is very difficult, or practically impossible, to unseat the filter cartridge by hand in order to remove the filter cartridge when it is time for replacement. In view of this difficulty, the can 12 has a second end 30 which has a gripping portion 32 adjacent thereto. The gripping portion 32 is defined by seven concave flutes 34. Each flute 34 has an axially extending concave wall 36 which opens axially through the second end 30 of the can 10 which is closed by a domed end surface 38. As is readily seen in FIG. 3, each flute 34 terminates in a radially extending, preferably sloping shelf 40 which extends transverse to the axially extending flute. The flutes 34 are separated by arcuate wall portions 42 of a cylindrical wall 44 which comprises the major axial extent of the can 12. Each flute has a maximum depth 45 which is defined by the difference between the outside diameter "D" of the can 12 and the minor diameter "d" of the flutes 34.

Spin on rotating filter cartridges 10 are generally provided in two sizes as exemplified by the following Examples A and B.

EXAMPLE A

| | |
|---|---|
| Overall axial length of can 12 | 5.106 inches |
| Length of gripping portion 32 | 1.250 inches |
| Outside diameter of can 12 | 3.668 inches |
| Minor diameter "d" of flutes 34 | 3.293 inches |
| Ratio of the minor diameter "d" of flutes 34 to the outside diameter "D" of the can 12 | 89.8% |
| Radius of flutes 34 | 2.447 inches |
| Depth of flutes 34 | 0.188 inch |

EXAMPLE B

| | |
|---|---|
| Overall axial length of can 12 | 4.759 inches |
| Length of gripping portion 32 | 1.250 inches |
| Outside diameter of can 12 | 2.897 inches |
| Minor diameter "d" of flutes 34 | 2.560 inches |
| Ratio of the minor diameter "d" of the flutes 34 to the outside diameter "D" of the can 12 | 87.7% |
| Radius of flutes 34 | 2.447 inches |
| Depth of flutes 34 | 0.188 inch |

From these dimensions, it is seen that the axial length of the can 12 can vary considerably to provide filter cartridges 10 of various volumes. However, in order to be ergonomically correct, the flutes 34 have a depth in a range of about 0.170 to about 0.195 inches and preferably in the range of about 0.180 to 0.190 inch which accommodates the specific depths 0.188 inch of Examples A and B. The axial length of the flutes 34 is in the range of 1.150 to 1.350 inch with the about 1.250 inch length of examples A and B being preferred. The ratio of the minor diameter "d" of the flutes the outside diameter "D" of the can 12 is in the range of 85 to 95% with the preferable range being about 87 to 90% which encompasses the ratios of 89.8% and 87.7% of Examples A and B.

The minor diameter "d" is derived by measuring the shortest radius to the bottom point of each flute 34 and doubling that radius. The minor diameter "d" is in a range of 85% to 95% of the outside diameter of the can 12 which is about 3.7 to 2.9 inches (see Examples A and B).

These dimensional parameters provide a gripping portion 32 which is ergonomically correct for the hands of mechanics and vehicle owners who usually change oil filters. Consequently, under most circumstances the spin-on filter cartridges can be removed by hand without resorting to a wrench.

Figure 4:
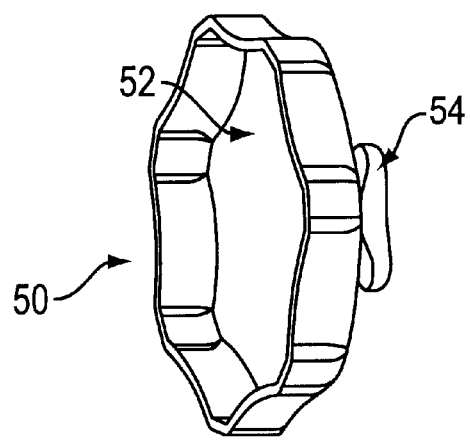
FIG. 4 is a perspective view of a tool used with the filter cartridge of FIGS.
Figure 5:
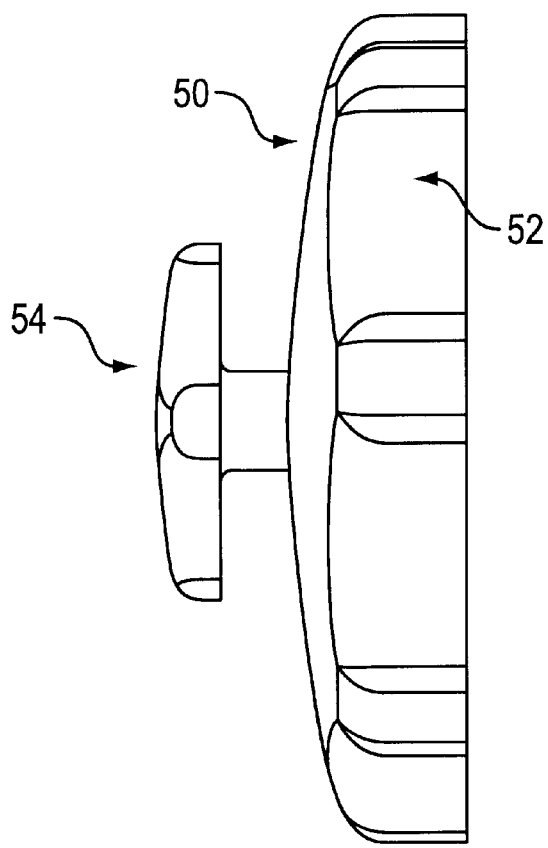
FIG. 5 is a side view of the tool shown in FIG. 4.
Figure 6:
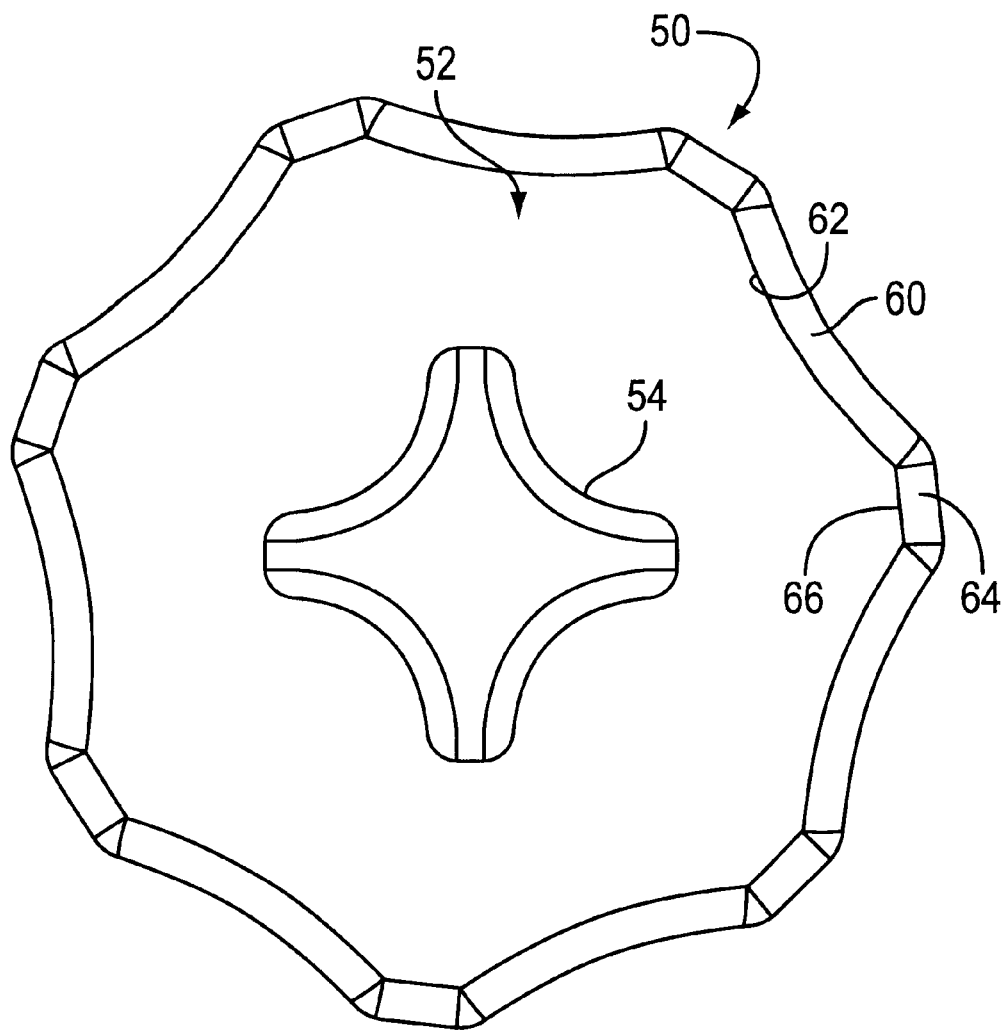
FIG. 6 is a top view of the tool shown in FIGS. 4–5.

Referring now to FIGS. 4–6 where a tool 50 configured as a socket wrench is shown, tool 50 includes a socket portion 52 and a handle portion 54. Socket portion 52 is defined by a radially extending; domed end plate 56 which has an axially extending rim 58. The axially extending rim 58 has first arcuate portions 60 each having an inner wall surface 62 which compliment the concave arcuate walls 36 of the flutes 34 and second portions 64 which have inner surfaces 66 that compliment arcuate wall portions 42. Consequently, the socket 52 of the wrench 50 slides axially over the gripping portion of the can 12 to establish a non-rotational relationship therewith.

In order to conveniently rotate the tool 50, the handle 54 is comprised of a knob 70 having four flutes 72 formed therein to facilitate easy gripping of the knob. The knob 70 is preferably fixed to the domed end 56 of the socket 52 by a stem 72 to form a ridged specialty tool or wrench for applying torque to the filter cartridge 10 in order to remove the spin on cartridge 10 from an engine for replacement.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A can for containing a filter element of a spin-on filter cartridge for an engine, the spin-on filter cartridge having a base plate with a threaded port therethrough and an annular gasket thereon, wherein the threaded port and annular gasket tightly couple the cartridge to the engine, the can comprising:

a first end and a second end, wherein the first end includes the base plate for coupling the cartridge to the engine with at least a selected level of torque, and a gripping portion adjacent the second end, the gripping portion consisting of seven arcuate flutes with each flute having an axially extending concave wall which opens axially through the second end of the can to facilitate gripping of the can.

2. A can according to claim 1 wherein the flutes terminate in bottom shelves which extend radially inward from a cylindrical outer wall surface of the can.

3. A can according to claim 2 wherein the flutes are spaced from one another by arcuate segments of the outer cylindrical wall surface of the can.

4. A can according to claim 3 wherein the concave wall of each flute has a bottom point defined by the shortest radius of the can which intersects the flute and wherein this radius when doubled defines a minor diameter of the can, the minor diameter being in a range of 85% to 95% of the outside diameter of the can which is about 3.67 inches or about 2.9 inches.

5. A can according to claim 4 wherein the griping area has an axial length in the range of about 1.150 to about 1.350 inch.

6. A can according to claim 5 wherein the arcuate flutes have a depth in the range of about 0.170 inch to about 0.195 inch.

7. A can according to claim 6 wherein the can is made of metal.

8. A can according to claim 7 wherein the can is unitary and has a domed second end surface.

9. A can according to claim 1 wherein the ratio of the minor diameter of the flutes to the outside diameter of the can is in the range of about 85 to about 95%.

10. In combination, a spin-on filter cartridge for an internal combustion engine and a tool, the spin-on filter cartridge including a can for containing a filter element, the spin-on filter cartridge having a base plate with a threaded port therethrough and an annular gasket thereon, wherein the threaded port and annular gasket tightly couple the cartridge to the engine, the can comprising:

a first end and a second end, wherein the first end includes the base plate for coupling the cartridge to the engine with at least a selected level of torque;

a gripping portion adjacent the second end, the gripping portion consisting of seven arcuate flutes with each flute having an axially extending concave wall which opens axially through the second end of the can to facilitate gripping of the can, and a tool for rotating the cartridge about the axis, the tool having a socket of a shape complementing the shape of the gripping portion of the can, whereby the gripping portion of the can is received within the socket of the tool.

11. The combination of claim 10 wherein the tool includes a handle extending therefrom.

12. The combination of claim 11 wherein the handle extends from the end of the socket and is coaxial with the socket.

13. A combination according to claim 12 wherein the operating handle comprises stem fixed to the end of the socket and a knob fixed to the end of the stem.

14. A combination according to claim 13 wherein the knob is defined by a fluted edge.

15. The combination according to claim 14 wherein the knob has a diameter less than the can and the fluted edge of the knob has four concave flutes.

16. A combination according to claim 10 wherein the flutes terminate in bottom shelves which extend radially inward from a cylindrical outer wall surface of the can.

17. In combination, a spin-on filter cartridge for an internal combustion engine and a tool, the spin-on filter cartridge including a can for containing a filter element and the spin-on filter cartridge having a base plate with a threaded port therethrough and an annular gasket thereon, wherein the threaded port and annular gasket tightly couple the cartridge to the engine, the combination comprising:

a first end and a second end, wherein the first end includes the base plate for coupling the cartridge to the engine with at least a selected level of torque;

a gripping portion adjacent the second end, the gripping portion including seven flutes with each flute having an axailly extending concave wall which opens axially through the second end of the can to facilitate gripping of the can, and a tool for rotating the cartridge about the axis, the tool having a socket of a shape complementing the shape of the gripping portion of the can, and a handle extending from the socket and being coaxial therewith, the handle comprising a stem having one end fixed to the socket and another end fixed to a knob, whereby the gripping portion of the can is received within the socket of the tool.

18. A combination according to claim 17 wherein the knob is defined by a fluted edge.

19. The combination according to claim 18 wherein the knob has a diameter less than the can and the fluted edge of the knob has four concave flutes.

20. A combination according to claim 17 wherein the flutes terminate in bottom shelves which extend radially inward from a cylindrical outer wall surface of the can.

* * * * *